US008503698B2

(12) United States Patent
Aoki et al.

(10) Patent No.: US 8,503,698 B2
(45) Date of Patent: Aug. 6, 2013

(54) MIXING APPARATUS

(75) Inventors: Takamitsu Aoki, Hamamatsu (JP); Masaaki Okabayashi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 376 days.

(21) Appl. No.: 12/847,502

(22) Filed: Jul. 30, 2010

(65) Prior Publication Data

US 2011/0026738 A1 Feb. 3, 2011

(30) Foreign Application Priority Data

Aug. 3, 2009 (JP) ................................ 2009-180376
Mar. 21, 2010 (JP) ................................ 2010-082137

(51) Int. Cl.
*H02B 1/00* (2006.01)

(52) U.S. Cl.
USPC ............... 381/123; 381/119; 381/103; 381/7; 381/12; 700/94

(58) Field of Classification Search
USPC ............... 381/80, 81, 98, 101, 102, 119, 123, 381/7, 103, 1, 2, 10, 12, 20, 306, 61, 85, 381/332, 333, 100, 107, 120; 700/94, 2, 12, 700/53; 369/1–12
See application file for complete search history.

(56) References Cited

U.S. PATENT DOCUMENTS

2004/0138873 A1 * 7/2004 Heo et al. ...................... 704/201
2006/0015198 A1 * 1/2006 Okabayashi et al. ........... 700/94

FOREIGN PATENT DOCUMENTS

JP 2005-252328 9/2005
JP 2005252328 A * 9/2005
JP 2006-270507 10/2006

* cited by examiner

*Primary Examiner* — Vivian Chin
*Assistant Examiner* — Leshui Zhang
(74) *Attorney, Agent, or Firm* — Morrison & Foerster LLP

(57) ABSTRACT

Signal of a channel selected in accordance with a cue instruction is supplied to a cue bus. Cue signal processing section provided in the cue bus can perform one or more signal processing operations, selected from among a predetermined plurality of different signal processing operations, such as "Delay", "Insert" and "Equalizer". For each of a plurality of channel types, a set of setting information is stored which contains information for setting ON or OFF of individual ones of the plurality of different signal processing operations. The set of setting information corresponding to the type of the channel selected via the cue instruction is referenced, and one or more signal processing operations is determined in such a manner that each signal processing operation set in an ON state in the setting file in correspondence with the type of the selected channel is performed on the signal supplied to the cue bus.

15 Claims, 9 Drawing Sheets

MIXING APPARATUS

BACKGROUND

The present invention relates to a mixing apparatus having a function for performing signal processing operations on a cue signal (i.e., audio signal output from a CUE bus) for auditorily monitoring a signal of a selected section of the mixing apparatus on the basis of cue operation, and a method for setting ON or OFF of the individual signal processing operations in the mixing apparatus.

As one form of audio signal processing apparatus, there have heretofore been known mixing apparatus for use in concerts, events, gatherings, theatrical performances, etc., which are constructed to mix audio signals, output from a multiplicity of microphones, electric and electronic musical instruments, etc. after adjusting levels and frequency characteristics of the audio signals and then output the mixed audio signals to a power amplifier. A human operator, operating such a mixing apparatus, operates various panel controls of the mixing apparatus to adjust volumes and colors of audio signals of musical instrument tones and singing voices into states that appear to most suitably express a performance. The mixing apparatus includes a plurality of input channels, mixing buses for mixing sound signals (audio signals) supplied from the input channels, and output channels for outputting mixed sound signals. Each of the input channels controls frequency characteristics, mixing level, etc. of a sound signal input thereto and then outputs the thus-controlled sound signal to the individual mixing buses, and each of the mixing buses mixes the sound signals input from the input channels and outputs the mixed sound signal to a corresponding one of the output channels. Output signals from the output channels are amplified and audibly output through speakers etc.

Such mixing apparatus are equipped with a CUE function section for auditioning or auditorily monitoring a signal of a given input channel or output channel on the basis of cue operation without changing mixing (adjustment) states in the mixing apparatus. With the cue function, a signal of a selected input channel or output channel is supplied to a CUE bus in response to turning-on of a CUE switch of a channel strip controlling the input channel or output channel, so that an audio signal output from the CUE bus (hereinafter referred to as "CUE signal") is output to a human operator through headphones, monitoring speaker or the like. In this case, a sound heard from a main speaker takes on a propagation delay at the position of the human operator of the mixing apparatus, and thus, a delay portion for delaying the cue signal is provided in the cue function section in order to absorb a time difference between the sound heard from the main speaker and the cue signal auditorily monitored by the human operator on the basis of cue operation.

Conventionally, even where a signal of an input channel is cued or monitored, the delay portion in the cue function section delays the cue signal. But, the signal of the input channel is a pre-mixing signal (i.e., signal before being subjected to mixing processing) and only part of a sound signal output from the main speaker, and thus, when cuing or monitoring the signal of the input channel, there is no need to conform the phase of the signal of the input channel to the phase of the sound signal output from the main speaker. Rather, when the input channel is to be cued, it is desired to monitor a non-delayed real-time cue signal; however, none of the conventionally-known mixing apparatus can monitor such a real-time cue signal because the signal of the input channel to be cued is delayed by the cue function section as noted above. Thus, it has been proposed that, once cuing is instructed, a determination be made as to whether the channel to be cued is an input channel or an output channel, and a delay operation be bypassed if the channel to be cued is an input channel.

Further, each of the output channels includes an equalizer portion that not only adjusts frequency balance at an audience's listening position but also prevents unwanted howling caused by a microphone within a venue. Further, in a monitor room, which has a smaller area than the venue, a blurred sound would be generated with low-frequency components of the sound confined within the monitor room. Thus, the cue function section uses an equalizer to reduce a boomy region so as to adjust a sound image to be clearer, and then outputs the thus-adjusted sound to the monitor room. However, the equalizer in the cue function section is constantly kept operative, and thus, when a signal of a given output channel is to be auditorily monitored on the basis of cue operation, signal processing is performed on a cue signal by both the equalizer inserted in the given output channel and the equalizer inserted in the cue channel; in this case, it is not possible to auditorily check as-is the sound of the given output channel. Therefore, it is presently proposed that, once cuing is instructed (i.e., a cue instruction is issued), a determination be made as to whether the channel to be cued is an input channel or an output channel, and a delay operation be bypassed if the channel to be cued is an output channel.

With the development of digital mixer techniques in recent years, it has become possible to diversify signal processing operations to be performed on a cue signal. For example, the inventors of the present invention propose that a CUE signal processing section include an insert portion in addition to delay and equalizer portions and that signal processing operations be performed on a signal, input to a CUE signal processing section, with an effecter etc. inserted. However, if the signal processing operations are diversified like this, operation for setting signal processing to be performed in accordance with a category of the cue signal would become very complicated, and thus, the conventionally-known mixing apparatus cannot appropriately deal with the diversification of the signal processing.

SUMMARY OF THE INVENTION

In view of the foregoing, it is an object of the present invention to provide an improved mixing apparatus which can readily set signal processing to be performed on a cue signal even if the signal processing is diversified.

In order to accomplish the above-mentioned object, the present invention provides an improved mixing apparatus, which comprises: a plurality of input channels; a plurality of mixing buses which mix signals supplied from the input channels; a plurality of output channels which output the signals mixed by the mixing buses; a cue instruction section which selects at least one of the channels where signals pass in the mixing apparatus; a cue bus to which is supplied the signal of the channel selected via the cue instruction section; a cue signal processing section which is capable of performing one or more signal processing operations, selected from among a predetermined plurality of different signal processing operations, on the signal supplied to the cue bus; a storage section storing therein, for each of a plurality of channel types, a set of setting information which contains information for setting ON or OFF of individual ones of the plurality of different signal processing operations, each of the channels where signals pass in the mixing apparatus being classified into at least one of the plurality of channel types in accordance with an attribute of the channel; and a determination section which references the set of setting information corresponding to the channel type of the channel selected via the cue instruction section and determines one or more signal processing operations, which are to be performed by the cue signal processing section, in such a manner that each signal processing operation set in an ON state in the set of setting information in correspondence with the channel type of the selected channel is performed on the signal supplied to the cue bus.

Namely, according to the present invention, one of a plurality of sets of setting information is referenced in accordance with the type of the channel selected in accordance with a cue instruction, and one or more signal processing operations, which are to be performed by the cue signal processing section, are automatically determined in such a manner that each signal processing operation set in an ON state in the set of setting information in correspondence with the type of the selected channel is performed on the signal supplied to the cue bus. Thus, even where the signal processing operations to be performed on the signal supplied to the cue bus are diversified, the present invention can easily set ON or OFF of the individual signal processing operations.

According to a second aspect of the present invention, the present invention provides an improved mixing apparatus, which comprises: a plurality of input channels; a plurality of mixing buses which mix signals supplied from the input channels; a plurality of output channels which output the signals mixed by the mixing buses; a cue instruction section which selects at least one of the channels where signals pass in the mixing apparatus; a cue bus to which is supplied the signal of the channel selected via the cue instruction section; a cue signal processing section which is capable of performing one or more signal processing operations, selected from among a predetermined plurality of different signal processing operations, on the signal supplied to the cue bus; a storage section storing therein, for each of a plurality of channel types belonging to a basic type, a set of setting information which contains information for setting ON or OFF of individual ones of the plurality of different signal processing operations, each of the channels where signals pass in the mixing apparatus being classified into at least one of the plurality of channel types in accordance with an attribute of the channel, the plurality of channel types being broadly classified into the basic type and an applied type, the storage section further storing therein, for each of channel types belonging to the applied type, a determining rule for setting each of the plurality of different signal processing operations in an ON or OFF state in dependence on the set of setting information; a first determination section which references the set of setting information in response to a channel type, belonging to the basic type, being selected via the cue instruction section and determines one or more signal processing operations, which are to be performed by the cue signal processing section, in such a manner that each signal processing operation set in the ON state in the set of setting information in correspondence with the channel type of the selected channel is performed on the signal supplied to the cue bus; and a second determination section which 1) references the determining rule in response to a channel type, belonging to the applied type, being selected via the cue instruction section, 2) references the set of setting information corresponding to a given channel type belonging to the basic type to be depended on in accordance with the determining rule, 3) determines, for each of the plurality of different signal processing operations, whether the signal processing operation should be set in the ON or OFF state, in accordance with the referenced set of setting information and the referenced determining rule and 4) determines one or more signal processing operations, which are to be performed by the cue signal processing section, in such a manner that each signal processing operation set in the ON state is performed on the signal supplied to the cue bus.

According to a third aspect of the present invention, the present invention provides an improved mixing apparatus, which comprises: a plurality of input channels; a plurality of mixing buses which mix signals supplied from the input channels; a plurality of output channels which output the signals mixed by the mixing buses; a cue instruction section which selects at least one of the channels where signals pass in the mixing apparatus; a cue bus to which is supplied the signal of the channel selected via the cue instruction section; a cue signal processing section which is capable of performing one or more signal processing operations, selected from among a predetermined plurality of different signal processing operations, on the signal supplied to the cue bus; a storage section storing therein, for each of one or some of a plurality of channel types, a set of setting information which contains information for setting ON or OFF of individual ones of the plurality of different signal processing operations, each of the channels where signals pass in the mixing apparatus being classified into at least one of the plurality of channel types in accordance with an attribute of the channel; a first determination section which determines whether a channel type of the channel selected via the cue instruction section is among the one or some of a plurality of channel types, and which, if it has been determined that the channel type of the channel selected via the cue instruction section is among the one or some of a plurality of channel types, references the set of setting information corresponding to the channel type of the channel selected via the cue instruction section and determines one or more signal processing operation, which is to be performed by the cue signal processing section, in such a manner that each signal processing operation set in an ON state in the setting file in correspondence with the channel type of the selected channel is performed on the signal supplied to the cue bus; and a second determination section which, if it has been determined that the channel type of the channel selected via the cue instruction section is not among the one or some of a plurality of channel types, further determines whether the channel type of the channel selected via the cue instruction section is associated with any one of the one or some of a plurality of channel types, and which, if it has been determined that the channel type of the channel selected via the cue instruction section is associated with any one of the one or some of a plurality of channel types, references the set of setting information corresponding to the one channel type with which the channel type of the channel selected via the cue instruction section is associated and determines one or more signal processing operations, which are to be performed by the cue signal processing section, in such a manner that each signal processing operation set in the ON state in correspondence with the channel type corresponding to the referenced set of setting information is performed on the signal supplied to the cue bus.

The present invention may be constructed and implemented not only as the apparatus invention as discussed above but also as a method invention.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION

Figure 1:
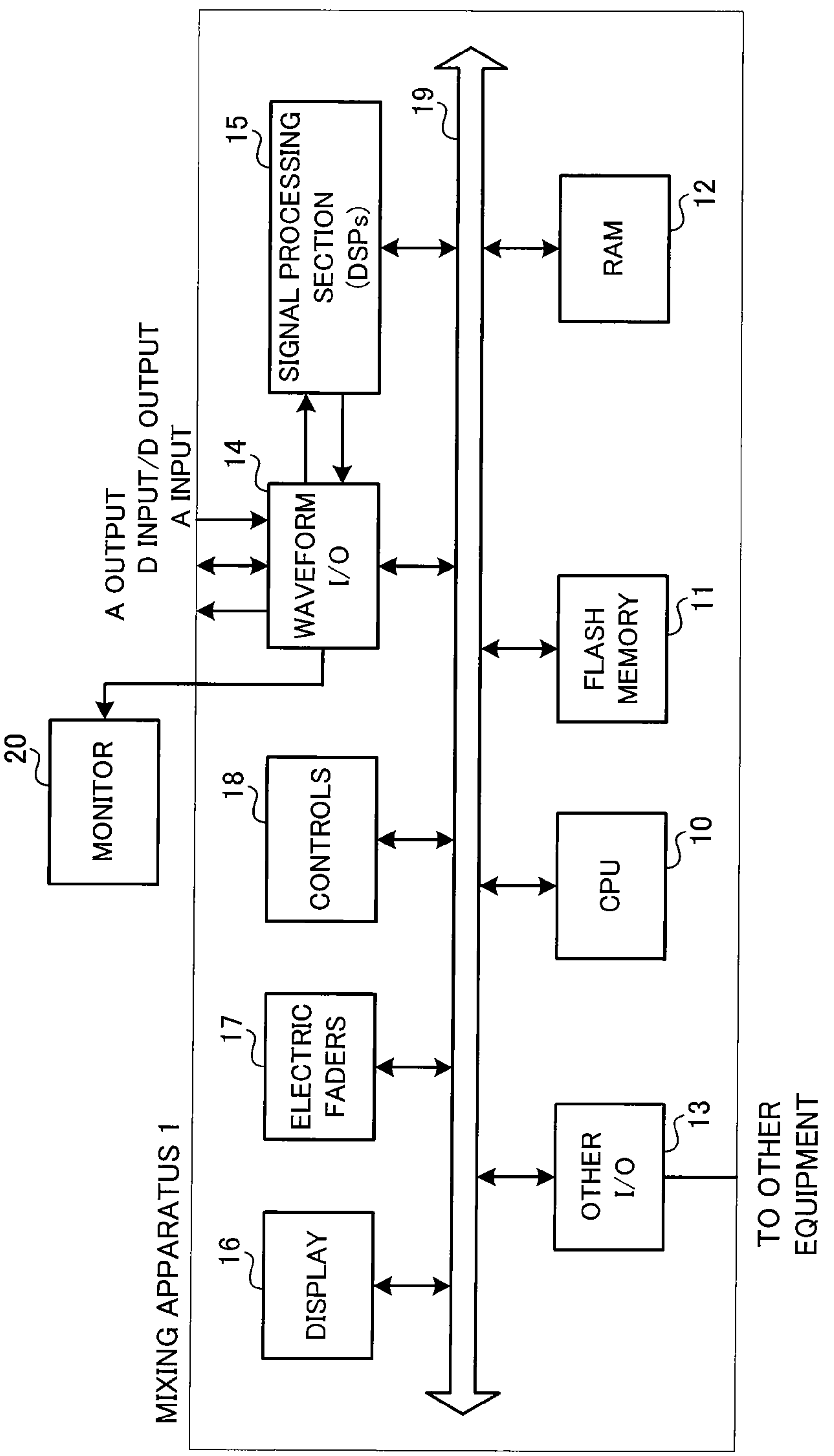
FIG. 1 is a block diagram showing an example construction of an embodiment of a mixing apparatus of the present invention.

FIG. 1 is a block diagram showing an example construction of an embodiment of a mixing apparatus of the present invention. The mixing apparatus 1 of FIG. 1 includes a CPU (Central Processing Unit) 10 that not only controls overall operation of the entire mixing apparatus 1 but also generates control signals in response to operation, by a human operator or user, of various mixing controls (operators), a rewritable, non-volatile flash memory 11 having stored therein operating software, such as a mixing control program, which is to be executed by the CPU 10, and a RAM (Random Access Memory) 12 including a working area for the CPU 10 and storing various data etc. By the operating software being stored in the flash memory 11 like this, version upgrade of the operating software can be done. A digital recorder and other devices are connected to the mixing apparatus 1 via an "other I/O" 13 that is an input/output interface.

All input and output to and from the mixing apparatus 1 is performed via a waveform I/O (waveform data interface) 14. This waveform I/O 14 includes: a plurality of analog (A) input ports to which are input analog signals; a plurality of analog (A) output ports from which are output analog signals; and a plurality of bidirectional digital (D) input/output ports for inputting digital signals from outside of the mixing apparatus 1 and outputting digital signals to outside of the mixing apparatus 1. The waveform I/O 14 also includes a monitoring port for outputting a cue signal and monitor signal in response to the human operator of the mixing apparatus 1 operating any of the mixing controls 18. The cue signal and monitor signals output from the monitoring port are supplied to a human operator's monitor 20 in an operator room, so that the human operator can operate the mixing apparatus 1 while monitoring signals of various channels. Further, the human operator can auditorily monitor audio signals of a given input or output channel, signal sent to a performer, etc. The mixing apparatus 1 further includes a signal processing section 15 that comprises a multiplicity of DSPs (Digital Signal Processors) and performs mixing processing, sound signal processing, etc. under control of the CPU 10.

Further, in the mixing apparatus 1, a display device 16 is, for example, in the form of a liquid crystal display, on which are displayed setting screens for setting parameters of individual channels and a later-described CUE editing UI. Electric faders 17 are each a fader that is operable manually or electrically to adjust a level of a signal of an input channel or output channel. The above-mentioned controls 18 include assignment switches for assigning channel strips, provided on a not-shown operation panel, to output channels or input channels, cursor movement keys for moving a cursor displayed on the display device 16, an increase/decrease key for increasing or decreasing a set value, a rotary encoder for selecting a value to be set, an enter key for determining a set value, etc. The aforementioned components of the mixing apparatus 1 communicate data with one another via a bus 19.

Figure 2:
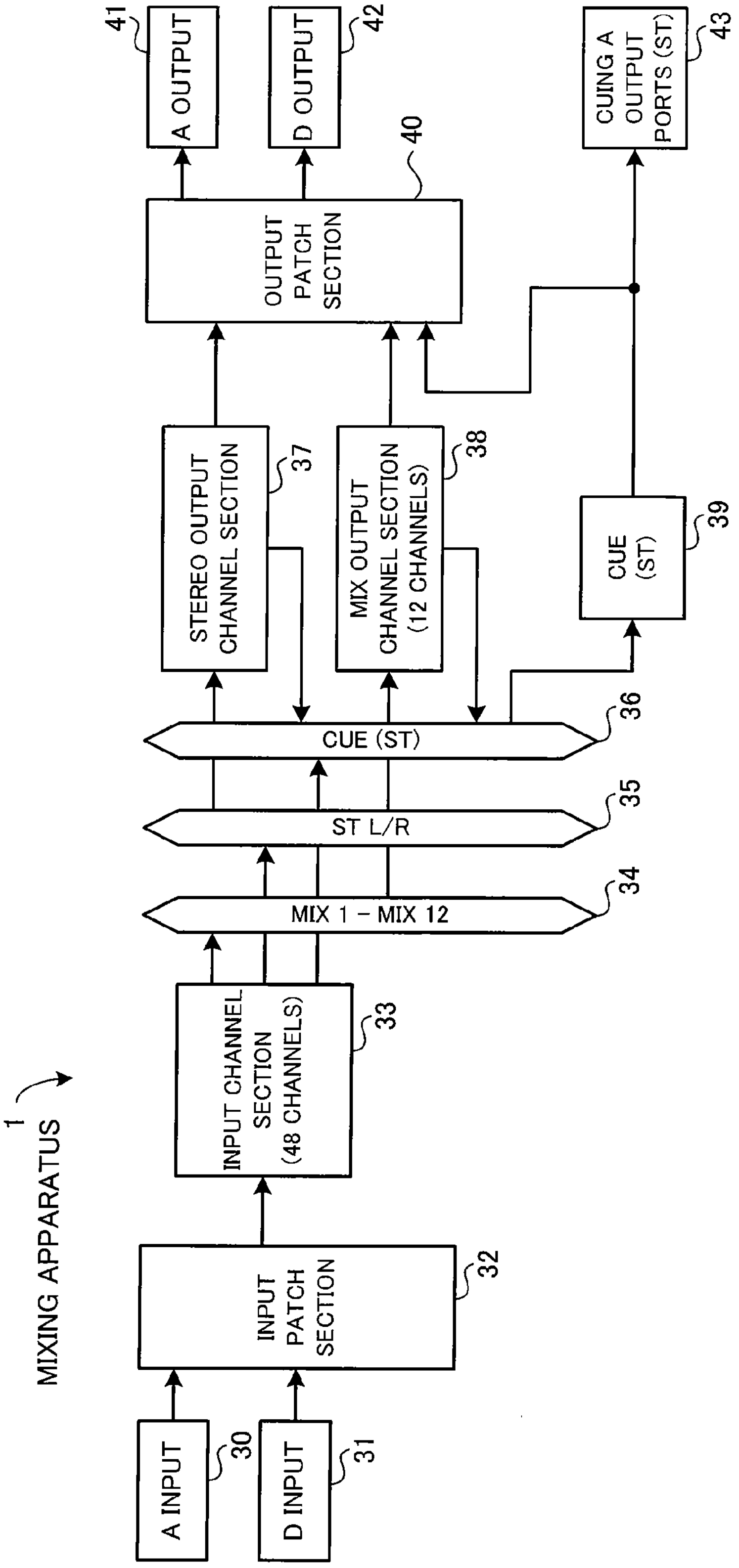
FIG. 2 is a functional block diagram equivalent to mixing processing performed by a signal processing section in the mixing apparatus and input/output ports of a waveform I/O connected to the mixing processing of the present invention.

FIG. 2 is a functional block diagram equivalent to the mixing processing performed by the signal processing section (DSP section) 18 in the mixing apparatus 1 constructed in the manner shown in FIG. 1 and input/output ports of the waveform I/O 14 connected to the mixing processing.

In FIG. 2, a plurality of analog signals input to an analog input ("A Input") section 30 including a plurality of analog input ports are converted into digital signals via an A/D converter provided in the waveform I/O 14, so that the thus-converted digital signals are input as-is to an input patch section 32. A plurality of digital signals input to a digital input ("D Input") section 31 including a plurality of digital input ports are input as-is to the input patch section 32. The input patch section 32 selectively patches (couples) each of a plurality of input ports, which are signal input sources, to any one or more of a plurality of (e.g., 48) input channels of an input channel section 33. Thus, audio signals are input to the input channels from the input ports patched by the input patch section 32.

Each of the input channels of the input channel section 31 includes an attenuator, equalizer, compressor, gate, fader, and a send level adjustment section for adjusting send levels at which the signal of the input channel is to be sent to 12 (twelve) mixing buses (MIX1-MIX12) 34. In each of these input channels, frequency balance control and level adjustment is performed and send levels to the mixing buses 34 are adjusted. A signal of each of the 48 channels (i.e., input channel signals) output from the input channel section 33 is selectively output to one or more of the 12 mixing buses 34 and stereo buses (ST L/R) 35. In each of the 12 mixing buses 34, one or more input channel signals selectively input from any one or more of the input channels are mixed together, and the resultant mixed signal (mixed output) is output to a MIX output channel section 38 having 12 (twelve) channels. In this way, twelve different mixed outputs are supplied to the MIX output channel section 38. Each of the output channels of the MIX output channel section 38 includes an attenuator, equalizer, compressor and fader, so that frequency balance and level adjustment is performed and send levels to an output patch section 40 are controlled.

Further, in each of the L- and R-channel buses of the stereo buses 35, one or more input channel signals selectively input from any one or more of the 48 input channels are mixed together, so that stereo signals of the L and R channels are output to a stereo output channel section 37. Each of L and R stereo output channels of the stereo output channel section 37 includes an attenuator, equalizer, compressor and fader, so that frequency balance and level adjustment is made and send levels to the output patch section 40 are controlled.

To a stereo CUE bus (CUE(ST)) 36 are supplied a signal of an input channel of the input channel section 33 for which a CUE instruction has been issued (i.e., CUE-instructed input channel), stereo signals of L and R channels of the stereo output channel section 37 for which a CUE instruction has been issued (i.e., CUE-instructed L and R channels), or a signal of a cue-instructed output channel of the output channel section 38. In this case, a cue instruction is issued only for one of the input channels, stereo output channels and MIX output channel. An audio signal output from the CUE bus 36 (i.e., CUE signal) is supplied to a CUE signal processing section (CUE(ST)) 39. The CUE signal processing section 39 includes software or hardware means for implementing processing operations, such as delay, insert and equalizer (EQ) operations, so that signal processing operation corresponding to attributes of the cue-instructed channel is performed on the cue signal and the thus-processed cue signal is output from the CUE signal processing section 39. The cue signal output (i.e., cue output) from the CUE signal processing section 39 is supplied to the output patch section 40 and cuing analog (A) output ports (stereo) 43.

The output patch section 40 can selectively patch (couple) each of the stereo output channels of the stereo output channel section 37, MIX output channels of the output channel section 38 and cue outputs of the CUE signal processing section 39 to any one or more of output ports of an analog output port section ("A output") 41 and digital output port section ("D output") 42. A signal from the channel patched by the output patch section 40 is supplied to each of the output ports.

Further, each digital output signal supplied to the analog output port section ("A output") 41 having a plurality of analog output ports is converted into an analog output signal via a D/A converter provided in the waveform I/O 14 and then output from the corresponding analog output port. Then, each analog output signal from the analog output port section ("A output") 41 is amplified and audibly output through a main speaker. The analog output signal is also supplied to an in-ear, monitor attached to a performer and/or reproduced through a stage monitor speaker provided near the performer. Further, each digital audio signal output from the digital output port section ("D output") 42 having a plurality of digital output ports is supplied to a recorder, externally-connected DAT and/or the like for digital recording. Furthermore, each cue output supplied to the cuing A output ports (stereo) 43 is converted into an analog output signal and then output through a monitoring speaker installed in a monitor room and headphones attached to the human operator.

Figure 3:
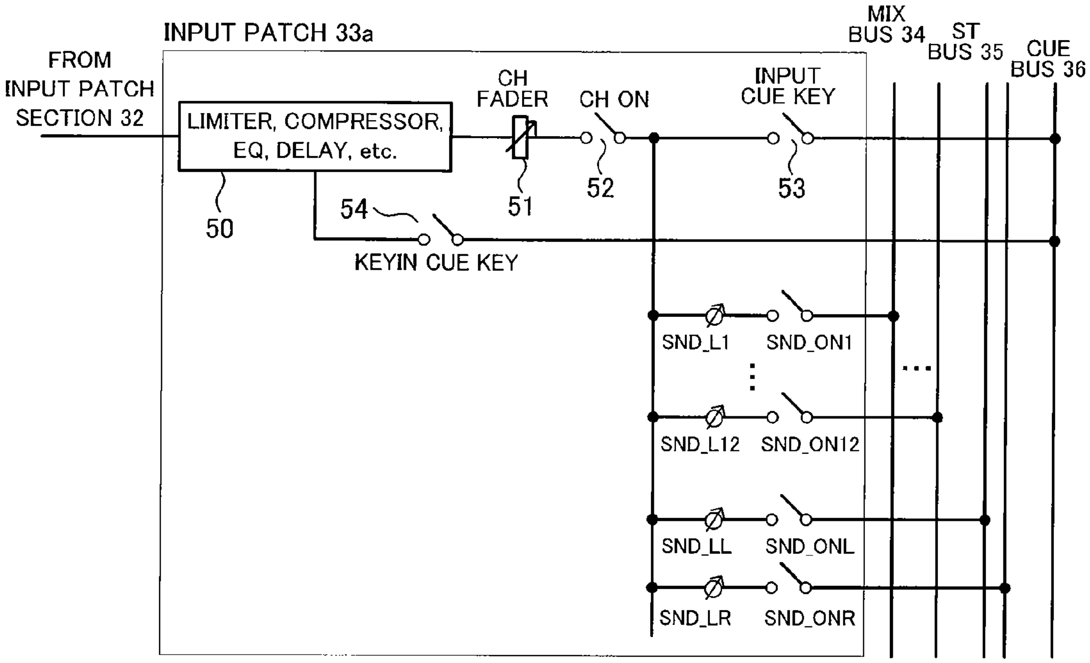
FIG. 3 is a diagram showing an example detailed construction of an input channel of the mixing apparatus of the present invention.

The 48 input channels of the input channel section 33 are constructed identically to one another, and FIG. 3 shows a detailed construction of only a representative one of the input channels 33*a*. As shown in FIG. 3, a signal input from the input patch section 32 to the input channel 33*a* is adjusted in level, frequency characteristic and delay time by means of a processing section 50 including a limiter, compressor, equalizer (EQ), delay and other portions. The reason why the input signal is delayed by the delay portion is to synchronize timing between the input signal and signals of the other input channels; thus, in the case of stereo signals, timing can be synchronized between the L and R channels. The signal output from the processing section 50 is control in level by a channel (CH) fader 51 and then supplied to a CH-ON switch 52 that turns on the input channel 33*a*. The input channel signal output from the CH-ON switch 52 is supplied to the CUE bus 36 via an INPUT CUE key 53 that is turned on when a cue instruction has been issued for the input channel 33*a*.

The input channel signal output from the CH-ON switch 52 is adjusted in send level by 12 (twelve) send level adjustment sections SND_L1–SND_L12, and then, the signals having been thus adjusted in send level are supplied, via 12 send switches SND_ON1–SND_ON12, to corresponding ones of the 12 (twelve) mixing buses 34. The send level adjustment sections SND_L1–SND_L12 and send switches SND_ON1–SND_ON12 are set as desired separately for each of the 12 mixing buses 34. Further, the input channel signal output from the CH-ON switch 52 is adjusted in send level by L- and R-channel send level adjustment sections SND_LL and SND_LR, and then, the signals having been thus adjusted in send level are supplied, via L- and R-channel send switches SND_ONL–SND_ONR, to corresponding ones of the L- and R-channel stereo buses 35. Further, a key-in signal input to the processing section 50 is supplied to the CUE bus 36 via a KEYIN CUE key 54 that is turned on when cuing of a key-in channel has been instructed. Note that "key-in" is a function for allowing a compression operation by the compressor portion to be started simultaneously in a plurality of channels. More specifically, by the human operator making a key-in setting as to the input level of which channel should be referenced in a given channel, the "key-in" function allows the compression operation by the compressor portion to be started with reference to the input level of the channel selected in the given channel. Thus, in the given channel for which the key-in has been set (i.e., key-in channel), a signal of the channel selected by the key-in setting is input as a key-in signal, and the compressor is caused to operate on the basis of the level of the key-in signal.

Figure 4:
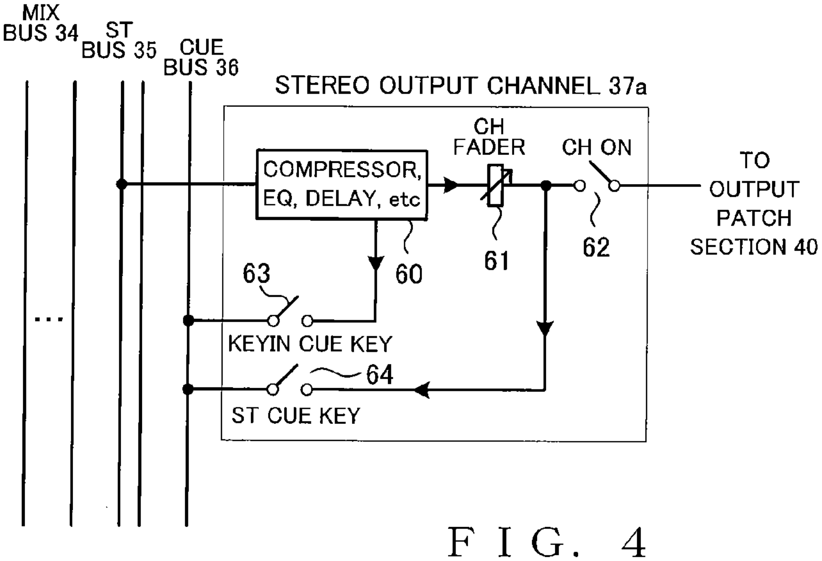
FIG. 4 is a diagram showing an example detailed construction of a stereo output channel of the mixing apparatus of the present invention.

The L and R stereo output channels of the stereo output channel section 37 are constructed identically to each other, and FIG. 4 shows an example detailed construction of only a representative one of the stereo output channels. In the stereo output channel 37*a*, as shown in FIG. 4, a signal input from any one of the L- and R-channel stereo buses 35 is adjusted in level, frequency characteristic and delay time by a processing section 60 having compressor, equalizer (EQ), delay and other portions. The reason why the signal is delayed by the delay portion is to synchronize timing between the L ad R channels. The adjusted signal output from the processing section 60 is supplied to a CH fader 61 where the signal is controlled in level, so that the level-controlled signal is supplied to a CH-ON switch 62 that turns on the stereo output channel 37*a*. The stereo output channel signal thus output from the CH-ON switch 62 is supplied to the output patch section 40. The key-in signal input to the processing section 60 is supplied to the CUE bus 36 via a KEYIN CUE key 63 that is turned on when cuing of a key-in channel has been instructed. Further, the stereo output channel signal output from the CH fader 61 is supplied to the CUE bus 36 via a ST CUE key 64 that is turned on when a cuing instruction has been issued for the stereo output channel 37*a*.

Figure 5:
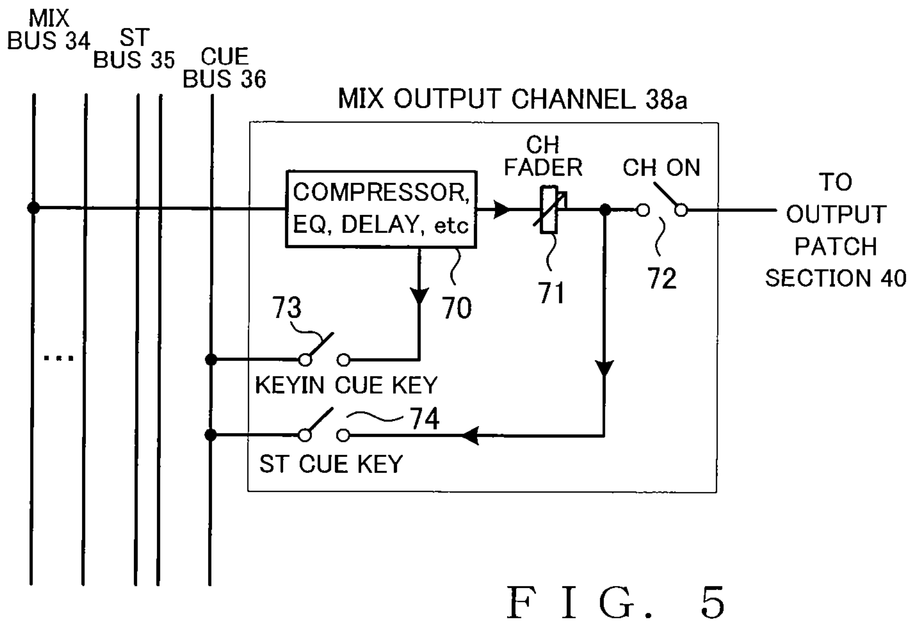
FIG. 5 is a diagram showing an example detailed construction of a MIX output channel of the mixing apparatus of the present invention.

The 12 MIX output channels of the MIX output channel section 38 are constructed identically to one another, and FIG. 5 shows an example detailed construction of a representative one of the MIX output channels 38*a*. In the MIX output channel 38*a*, as shown in FIG. 5, a signal input from any one of the 12 mixing buses 34 is adjusted in level, frequency characteristic and delay time by a processing section 70 having compressor, equalizer (EQ), delay and other portions. The reason why the signal is delayed by the delay portion is to adjust a sound-image localized state, at an audience's listening position, of sounds output through speakers supplied with output signals from the output ports. The signal output from the processing section 70 is supplied to a CH-ON switch 72 that turns on the MIX output channel 38*a*. The MIX output channel signal thus output from the CH-ON switch 72 is supplied to the output patch section 40. A key-in signal input to the processing section 70 is supplied to the CUE bus 36 via a KEYIN CUE key 73 that is turned on when a cuing instruction has been issued for the key-in channel. Further, the MIX output channel signal output from the CH fader 71 is supplied to the CUE bus 36 via a MIX CUE key 74 that is turned on when a cuing instruction has been issued for the MIX output channel 38*a*.

Figure 6:
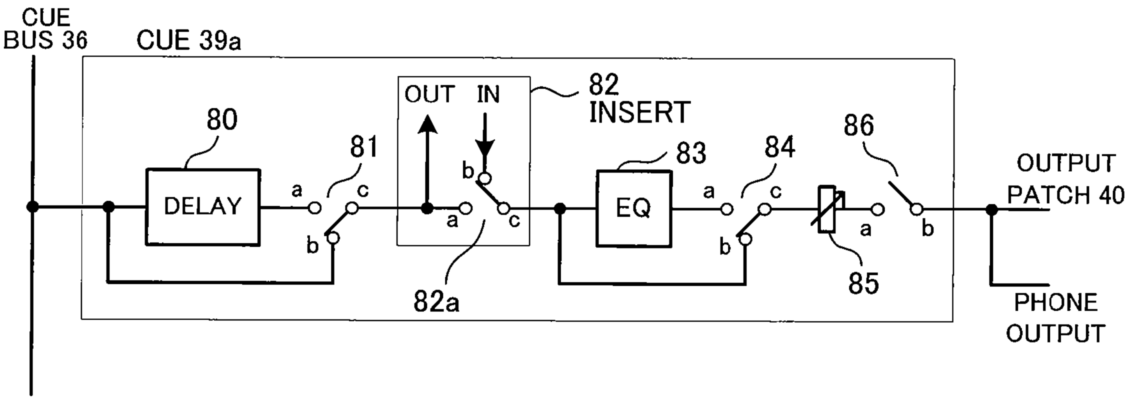
FIG. 6 is a diagram showing an example detailed construction of a CUE signal processing section of the mixing apparatus of the present invention.

The L- and R-channel CUE signal processing sections 39 are constructed identically to each other, and FIG. 6 shows an example detailed construction of only a representative one of the CUE signal processing sections 39*a*. As shown in FIG. 6, the CUE signal processing section 39*a* is supplied with a signal from the CUE bus 36. As noted above, the signal from the CUE bus 36*a* is a signal of a channel for which a cuing instruction has been issued (i.e., channel for which the CUE key has been turned on). The CUE signal processing section 39*a* includes a delay portion 80 for delaying the signal, an insert portion 82 having OUT and IN terminals, an equalizer (EQ) portion 83 for adjusting the level, on the frequency axis, of the signal, a fader portion 85 for adjusting the level of the signal, and a switch 86 that is turned on when cuing is to be effected. An output from the switch 86 is not only supplied to the output patch section 40, but also output via the cuing analog output port 43 to become a phone output for the human operator.

As noted above, a sound heard from the main speaker takes on a propagation delay during propagation to the human operator. Thus, the delay portion 80 is provided to delay the cue signal in accordance with the propagation delay. Further, a signal output from the OUT terminal of the insert portion 82 is supplied to a not-shown sound signal processing that is for example an effecter, and an output from this sound signal processing is supplied to the IN terminal of the insert portion 82. Further, as also noted above, the monitor room where the human operator is in has a small area so that a blurred sound would be generated with low-frequency components of the sound confined in the small area, and thus, the equalizer (EQ) portion 83 is provided to correct the sound to be a better sound.

As noted above, the delay portion 80 is unnecessary if the channel for which cuing has been instructed is an input channel, the equalizer portion 83 is unnecessary if the channel for which cuing has been instructed is a MIX output channel or stereo output channel, and the insert portion 82 too is unnecessary depending on the type of the channel for which cuing has been instructed. Therefore, the CUE signal processing section 39*a* further includes a switch 81 for bypassing the delay portion 80, a switch 82*a* for bypassing the insert portion 82, and a switch 84 for bypassing the EQ portion 83. When the CUE key has been turned on in order to cue any one of the input channels, a movable contact c of the switch 81 is switched to a fixed contact b so that the delay portion 80 is bypassed, and a movable contact c of the switch 84 is switched to a fixed contact a so that the EQ portion 83 is made operative. Further, when the CUE key has been turned on in order to cue any one of the MIX output channels or stereo output channels, the movable contact c of the switch 81 is switched to a fixed contact a so that the delay portion 80 is made operative, and the movable contact c of the switch 84 is switched to a fixed contact b so that the EQ portion 83 is bypassed. When the human operator wants to listen to a sound of a channel, for which the CUE key has been turned on, with an effect imparted to the sound, a movable contact c of the switch 82*a* is switched to a fixed contact b so that the insert portion 82 is made operative, Further, when the human operator wants to listen to a sound of a channel, for which the CUE key has been turned on, with no effect imparted to the sound, the movable contact c of the switch 82*a* is switched to a fixed contact a so that the insert portion 82 is bypassed. The aforementioned is just an illustrative example of a typical combination of signal processing operations performed in the CUE signal processing section 39 for one of the channels, and the present invention is not limited to such an illustrative example.

In the instant embodiment of the mixing apparatus 1, the channels are classified into six channel types in accordance with respective attributes of the channels. Each of the channels through which signals pass in the mixing apparatus 1 is classified into at least any one of the six channel types. Thus, in the mixing apparatus 1, six types of channels can send signals to the CUE bus 36; namely, an increased number of types of the channels can process a cue signal, and thus, an increased variety of, i.e. diversified, signal processing operations can be performed on the cue signal. The above-mentioned six channel types determined in accordance with the attributes of the channels are an "input" channel type, "MIX output" channel type, "stereo output" channel type, "first DCA" channel type, "second DCA" channel type, and "key-in" channel type. "DCA" as used herein refers to a function of grouping a plurality of channels as a single DCA (Digital Controlled Amplifier) group and collectively adjusting signal level values of the channels belonging to the DCA group. The first DCA type is a type that includes the input channel, but includes neither the MIX output channel nor stereo output channel. The second DCA type is a type that includes the MIX output channel and stereo output channel, but does not include the input channel. The channel that can input a signal to the CUE bus 36 is of any one of the aforementioned six channel types; in this case, a plurality of channels can input signals to the CUE bus 36 at the same time as long as the plurality of channels are of the same channel type.

A combination of the signal processing operations performed by the delay, insert and EQ portions 80, 82 and 83 on a cue signal can be generally determined in accordance with the type of the channel to be cued (i.e. channel providing the cue signal). Thus, ON/OFF states of the switch 81 for turning on or off the delay portion 80, the switch 82*a* for turning on or off the insert portion 82 and the switch 84 for turning on or off the EQ portion 83 in the CUE signal processing section 39 is determined in accordance with the type of the channel to be cued (i.e., channel providing the cue signal). Thus, in the instant embodiment, ON/OFF states of the switches 81, 82*a* and 84 are preset in accordance with the channel types, and such preset ON/OFF states are recorded in channel-type-specific CUE signal processing files (i.e., a plurality sets of setting information) as definitions of the channel types. Then, once the channel for which cuing is to be effected is switched from one channel to another, the definition is read out from the CUE signal processing file corresponding to the switched-to channel and set into the CUE signal processing section 39. In this way, a combination of signal processing operations to be performed on the cue signal in the CUE signal processing section 39 can be readily set promptly and accurately. Note that the ON state of each of the switches 81, 82a and 84 indicates that the corresponding signal processing operation is in an operative state while the OFF state of each of the switches 81, 82a and 84 indicates that the corresponding signal processing operation is in an inoperative state.

Figure 7:
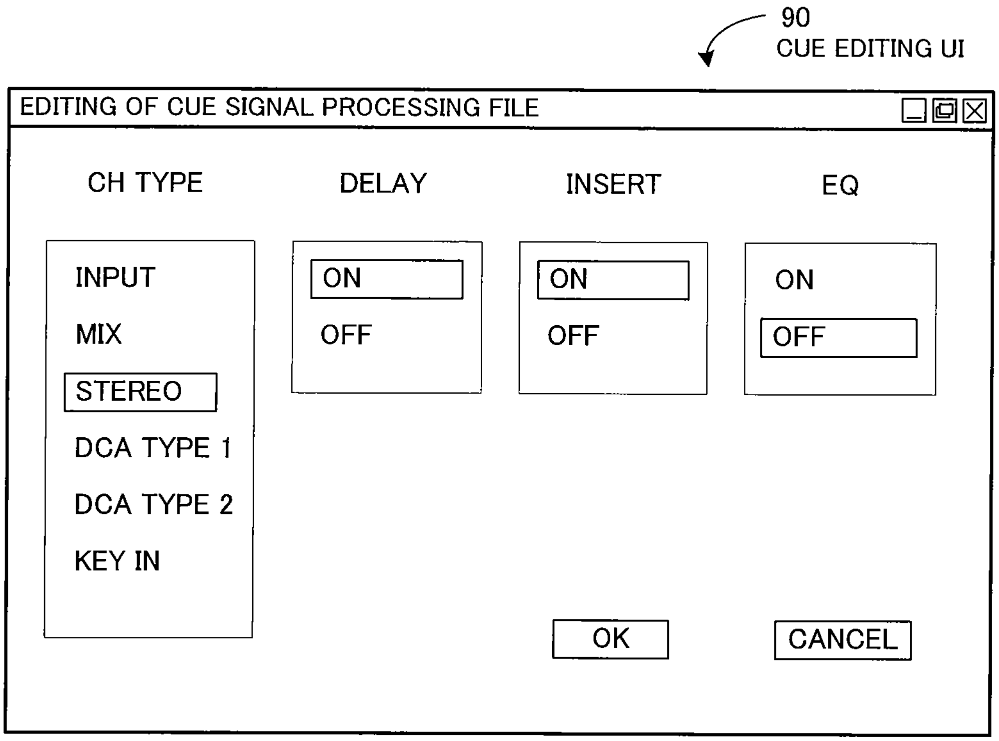
FIG. 7 is a diagram showing a display screen of a first CUE editing UI in the mixing apparatus of the present invention.

FIG. 7 shows a display screen of a first CUE editing UI 90 that edits a CUE signal processing file (i.e., a set of setting information). The first CUE editing UI 90 is capable of editing the CUE signal processing file. When the CUE signal processing file is to be edited, the first CUE editing UI 90, the user selects one channel type to be edited from a list of channel types displayed in a "CH Type" section of the screen. The list includes all of the six channel types capable of sending signals to the CUE bus 36, i.e. the input channel (INPUT), MIX output channel (MIX), stereo output channel (STEREO), first DCA type (DCA Type 1), second DCA type (DCA Type 2), and key-in channel (KEYIN). In the illustrated example of FIG. 7, the "STEREO" channel type has been selected as indicated by being surrounded by a rectangular frame, and the CUE signal processing file corresponding to the selected stereo output channel type is set as a file to be edited. Further, in a section of the screen for setting an ON/OFF instruction of "Delay", the user selects ON or OFF. In the illustrated example of FIG. 7, "ON" has been selected as indicated by being surrounded by a rectangular frame. Further, in sections of the screens for setting ON/OFF instructions of "Insert" and "EQ", the user selects ON or OFF. In the illustrated example of FIG. 7, "ON" has been selected in the "Insert" section as indicated by being surrounded by a rectangular frame, and "OFF" has been selected in the "EQ" section as indicated by being surrounded by a rectangular frame. Once an "OK" button is clicked by the user, the selected ON/OFF states are overwritten into the CUE signal processing file to be edited. Namely, the respective ON/OFF states of "Delay", "Insert" and "EQ" recorded in the CUE signal processing file corresponding to the stereo output channel type are rewritten into the latest selected states.

Figure 8:
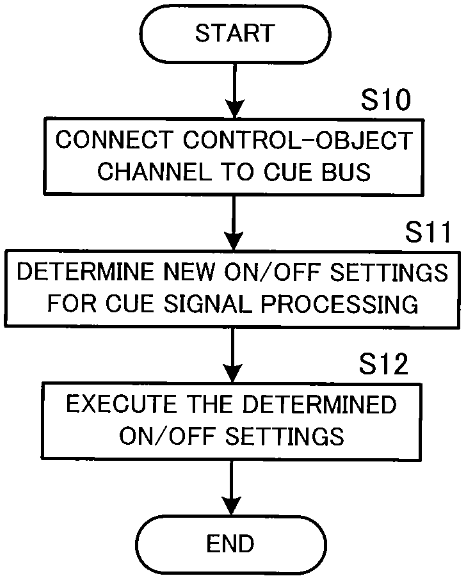
FIG. 8 is a flow chart of first CUE signal setting processing performed in the mixing apparatus of the present invention.

FIG. 8 is a flow chart of first CUE signal setting processing performed in the instant embodiment of the mixing apparatus 1. The first CUE signal setting processing is started up in response to operation of any one of the CUE keys provided in corresponding relation to the channels. At step S10, the channel corresponding to the operated CUE key is set as a channel to be controlled (i.e., control-object channel), and this control-object channel is connected to the CUE bus 36. In this case, the CUE key of the control-object channel is set into the ON state, while the channel having so far been connected to the CUE bus 36 is set into the OFF state and disconnected from the CUE bus 36. There are provided a plurality of channel strips to each of which is assignable any one of the channels, such as the input channel, MIX channel, stereo output channel and DCA channel, each of which includes, among other things, a fader for controlling the level of the assigned channel. The CUE key is provided in each of the channel strips, and the channel assigned to the channel strip whose CUE key has been operated is set as a control-object channel. Note that, if the channel having so far been connected to the CUE bus 36 is of the same channel type as the control-object channel, then the control-object channel may be additionally connected to the CUE bus 36 without the channel having so far been connected to the CUE bus 36 being disconnected from the CUE bus 36.

Next, at step S11, new ON/OFF settings are determined for the CUE signal processing. Namely, at step S11, the channel type of the control-object channel is detected or identified, and the CUE signal processing file corresponding to the identified channel type is read out. Then, ON/OFF states of all of the signal processing operations (by the delay portion 80, insert portion 82 and EQ portion 83) included in the CUE signal processing recorded in the read-out CUE signal processing file are determined as new ON/OFF settings. Then, as step S12, various setting changes are made such that signal processing operations based on the determined ON/OFF settings are performed in the CUE signal processing section 39. In the setting change operation, settings of the DSPs are changed because the mixing processing of FIG. 2 and the CUE signal processing section 39 are implemented by the DSPs of the signal processing section 15, and current values of a current buffer in the RAM 12 are rewritten. Upon completion of the operation at step S12, the first CUE signal setting processing is brought to an end. By performing such first CUE signal setting processing, a combination of signal processing operations to be performed on the cue signal in the CUE signal processing section 39 can be readily set promptly and accurately.

In the first CUE editing UI 190 and first CUE signal setting processing, channel types that can be set as objects of setting or editing are the six channel types, input channel (INPUT), MIX output channel (MIX), stereo output channel (STEREO), first DCA type (DCA Type 1), second DCA type (DCA Type 2), and key-in channel (KEYIN). However, there are certain relationships or associations in setting content between some of the channel types. For example, the INPUT channel type and the first DCA type are associated with each other, the MIX channel and the STEREO channel are associated with each other, and the MIX or STEREO and the second DCA type are associated with each other. Despite such associations, the same number of the CUE signal processing files as the channel types are employed in the aforementioned first CUE signal setting processing, and separate editing operations have to be performed in the individual CUE signal processing files. Thus, the editing of the CUE signal processing files tends to be very cumbersome. Further, because there are such CUE signal processing files for the individual channel types which the user desires to be associated with each other, it is also possible that the associations cannot be maintained in an accurate manner.

Thus, in the second CUE editing UI 91 and second CUE signal setting processing, setting processing is performed in accordance with a large classification where three of the six channel types, i.e. the INPUT, MIX and STEREO channel types, are set as channel types belonging to the basic type, and the remaining three channel types are set as channel types belonging to the applied type. Here, the "basic type" is a type classified in accordance with channel attributes determined depending on the system configuration of the mixer (mixing apparatus), while the "applied type" is a type classified in accordance with channel attributes determined depending on a form of application of the mixer (mixing apparatus). In executing the second CUE signal setting processing, each of the channel types belonging to the applied type is associated with at least one of the channel types belonging to the basic type, and such associations are stored as relationship data. Relationship data indicative of what kinds of relationships exist between the channel types of the basic type and the channel types of the applied type associated with each other (i.e., ON/OFF setting determining rules) are defined; such an ON/OFF setting determining rule is recorded for each of the channel types belonging to the applied type. The CUE signal processing file is provided for each of the channel types belonging to the basic type. Further, relationships in which the INPUT channel type belonging to the basic type should be associated with the first DCA type belonging to the applied type and in which ON/OFF settings of the INPUT channel type should be used as-is as ON/OFF settings of the first DCA type are defined as ON/OFF setting determining rules. Further, two of the channel types belonging to the basic type, i.e. MIX and STEREO channel types, are associated with one of the channel types belonging to the applied type, i.e. second DCA type. In setting ON/OFF of the second DCA type, a predetermined relationship in which ON is set for a signal processing operation that is ON in both of the MIX and STEREO channel types while OFF is set for a signal processing operation that is OFF in any one of the MIX and STEREO channel types, is defined as an ON/OFF setting determining rule; namely, ON/OFF states are determined in accordance with ANDed logic. In the second CUE editing UI 91, only the three channel types belonging to the basic type are displayed in the channel type list, and the user selects any one of the three channel types belonging to the basic type and edits the selected basic type. However, the user can not edit the channel types belonging to the applied type which are not displayed in the channel type list. Note that the aforementioned determining rule is a rule for determining ON/OFF states of the individual signal processing operations in the CUE signal processing section 39 of a given applied type on the basis of the CUE signal processing file of the basic type associated with the given applied type.

Figure 10:
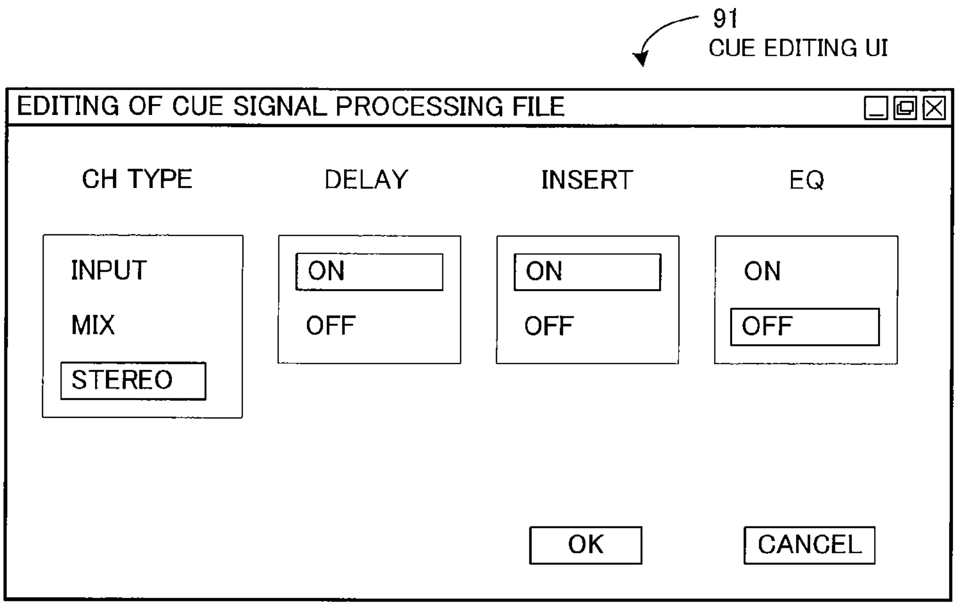
FIG. 10 is a diagram showing a display screen of a second CUE editing UI in the mixing apparatus of the present invention.

FIG. 10 shows a display screen of the second CUE editing UI 91 that edits a CUE signal processing file. The second CUE editing UI 91 is capable of editing CUE signal processing files of the channel types belonging to the basic type. When a CUE signal processing file is to be edited with the second CUE editing UI 91, the user selects a channel type from the list of the three channel types belonging to the basic type, i.e. INPUT, MIX and STEREO, displayed in a "CH TYPE" section of the screen. In the illustrated example of FIG. 10, "STEREO" has been selected as indicated by being surrounded by a rectangular frame. In a section of the screen for setting ON/OFF of "Delay", the user selects ON or OFF. In the illustrated example of FIG. 10, "ON" has been selected as indicated by being surrounded by a rectangular frame. Further, in sections of the screens for setting ON/OFF of "Insert" and "EQ", the user selects ON or OFF. In the illustrated example of FIG. 10, "ON" has been selected in the "Insert" section as indicated by being surrounded by a rectangular frame, and "OFF" has been selected in the "EQ" section as indicated by being surrounded by a rectangular frame. Once an "OK" button is clicked, the selected ON/OFF states are overwritten into the CUE signal processing file to be edited. Namely, the respective ON/OFF states of the "Delay", "Insert" and "EQ" operations recorded in the CUE signal processing file corresponding to the stereo output channel type to be edited are rewritten into the latest selected states.

Figure 9:
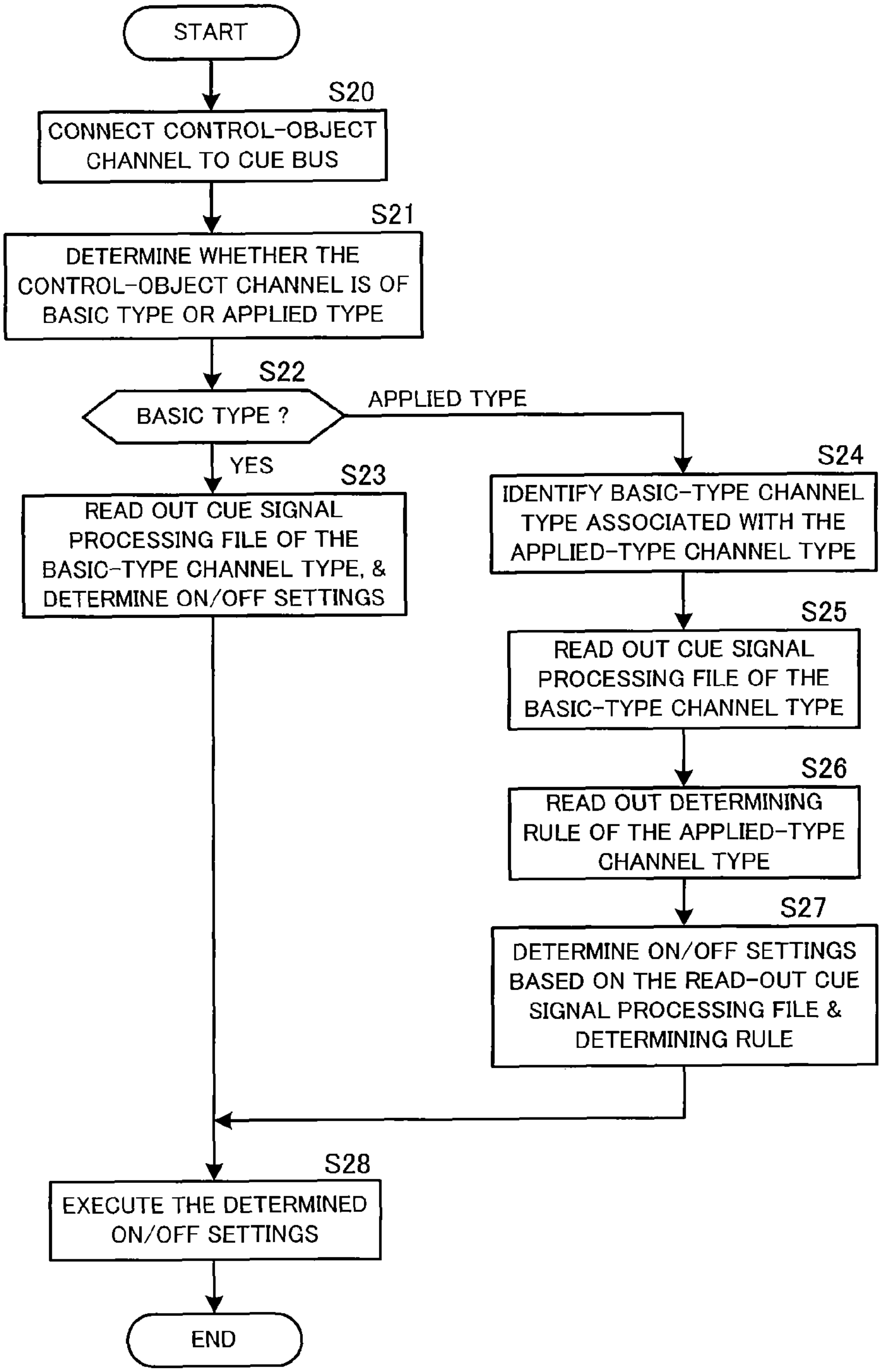
FIG. 9 is a flow chart of second CUE signal setting processing performed in the mixing apparatus of the present invention.

FIG. 9 is a flow chart of second CUE signal setting process performed in the instant embodiment of the mixing apparatus 1. The second CUE signal setting process is started up in response to operation of any one of the CUE keys provided in corresponding relation to the channels. At step S20, the channel corresponding to the operated CUE key is set as a channel to be controlled (i.e., control-object channel), and this control-object channel is connected to the CUE bus 36. The operation performed at step S20 is similar to the operation at step S10 of the aforementioned first CUE signal setting processing; thus, the operation of step S20 is not described in detail here. At next step S21, it is determined whether the type of the channel to be controlled (control-object channel) is the basic type or the applied type. At step S22, a determination is made as to whether the type of the control-object channel is the basic type. If the type of the control-object channel is the basic type as determined at step S22, control proceeds to step S23, where the CUE signal processing file corresponding to the identified channel type (basic-type channel type) is read out. Then, ON/OFF instructions of all of the signal processing operations (by the delay portion 80, insert portion 82 and EQ portion 83) included in the CUE signal processing recorded in the read-out CUE signal processing file are determined as new ON/OFF settings.

If, on the other hand, the type of the control-object channel is of the applied type, i.e. the control-object channel is of a channel type belonging to the applied type (i.e., applied-type channel type), as determined at step S22, control branches to step S24, where relationship data associating a basic-type channel type with the applied-type channel type determined at step S21 above is referenced to identify the basic-type channel type associated with the applied-type channel type. Then, the CUE signal processing file corresponding to the identified, associated basic-type channel type is read out at step S25. Further, the recorded ON/OFF setting determining rule of the applied-type channel type is read out at step S26. Then, new ON/OFF settings of the applied type are determined, at step S27, in accordance with the ON/OFF instructions recorded in the read-out CUE signal processing file read out at step S25 and the ON/OFF setting determining rule read out at step S26. Once the operation of step S23 or S27 is completed, control proceeds to step S28, where various setting changes are made such that signal processing based on the determined ON/OFF settings is performed in the CUE signal processing section 39. The operation performed at step S23 is similar to the operation at step S12 of the aforementioned first CUE signal setting processing; thus, the operation of step S23 is not described in detail here. Upon completion of the operation at step S28, the second CUE signal setting processing is brought to an end.

Whereas the instant embodiment has been described above as making ON/OFF settings on the basis of the CUE signal processing file and ON/OFF setting determining rule without creating an ON/OFF setting application file, it may create and record an ON/OFF setting application file as follows.

Namely, in the second CUE signal setting processing, if the type of the control-object channel is the applied type as determined at step S22, operations are performed at steps S24 to S27 for determining new ON/OFF settings for the control-object channel of the applied type. Alternatively, an ON/OFF setting application file may be created in advance for each of the channel types belonging to the applied type so that the second CUE signal setting processing can be performed promptly. The ON/OFF setting application file is a CUE signal file corresponding to any one of the channel types belonging to the applied type and corresponding to content determined at step S27 of the second CUE signal setting processing.

Figure 11:
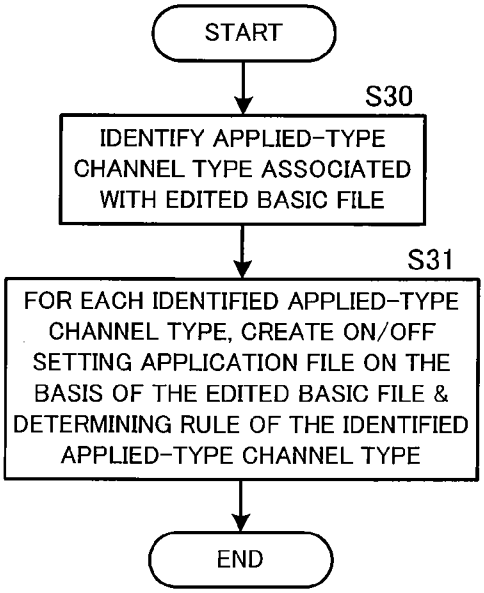
FIG. 11 is a flow chart of an ON/OFF setting application file creating process in the mixing apparatus of the present invention.

FIG. 11 is a flow chart of an application file creating process for creating an ON/OFF setting application file. The application file creating process of FIG. 11 is started up when any one of the CUE signal processing files (i.e., basic files) of the channel types belonging to the basic type (i.e., basic-type channel type) has been edited. At step S30, the channel type belonging to the applied type (i.e., applied-type channel type) which is associated with the edited basic file is detected or identified. Then, for each of the channel types belonging to the applied type (i.e., applied-type channel types) identified at step S30, an ON/OFF setting application file is created on the basis of the edited basic file and the ON/OFF setting determining rule of the identified applied-type channel type, and the thus-created ON/OFF setting application file is recorded, at step S31. Upon completion of the operation at step S31, the application file creating process is brought to an end. Namely, in the case where the application file creating process is performed, and if the control-object channel in the second CUE signal setting processing is of the applied type, an operation for reading out the application file corresponding to the applied-type channel type determined at step S21 may be performed in place of the operations of steps S24 to S27, and then, ON/OFF states of all of the signal processing operations (by the delay portion 80, insert portion 82 and EQ portion 83) included in the CUE signal processing recorded in the read-out CUE signal processing file may be determined as new ON/OFF settings.

Figure 12:
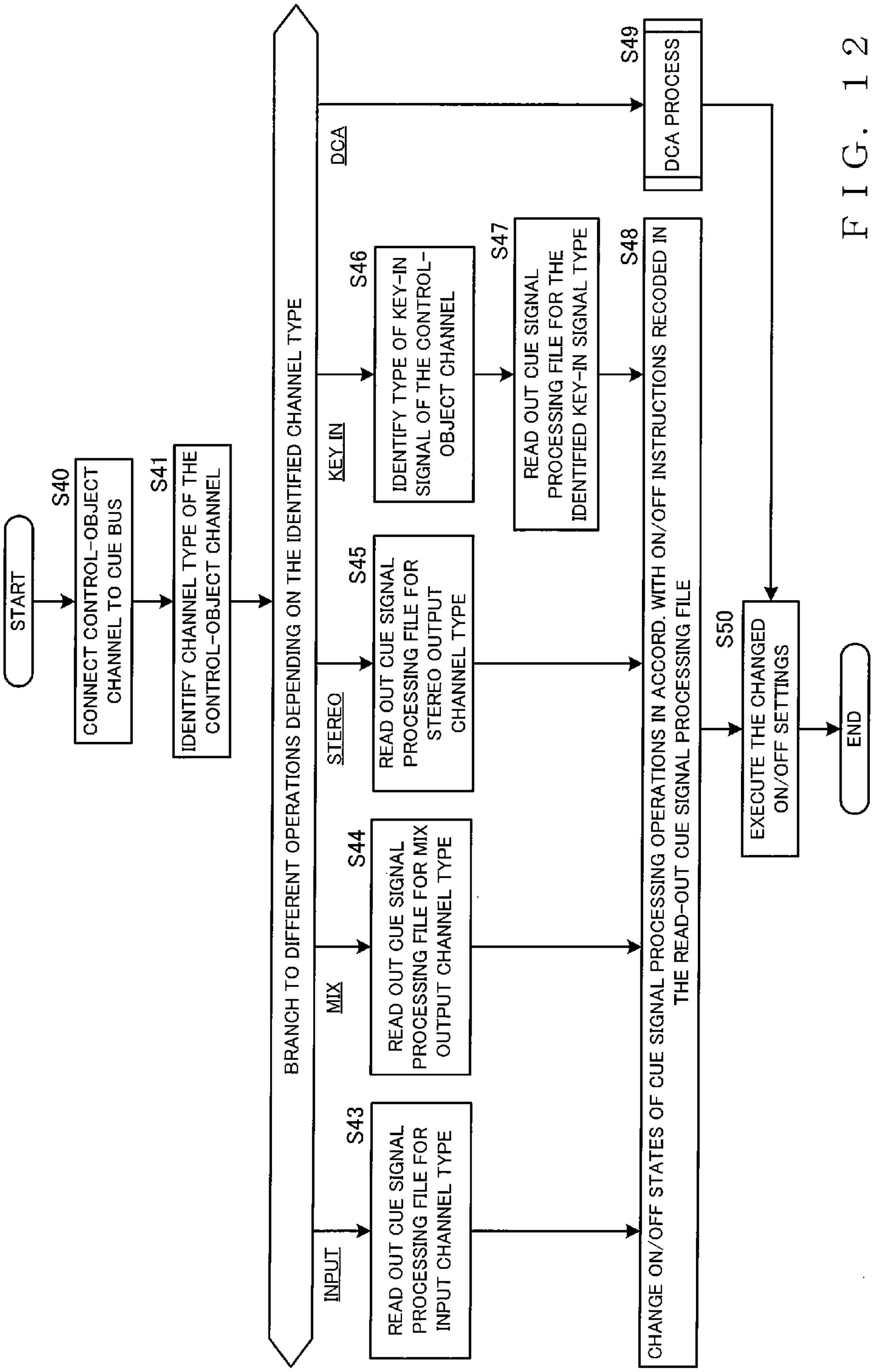
FIG. 12 is a flow chart of third CUE signal setting process performed in the mixing apparatus of the present invention.

FIG. 12 is a flow chart of third CUE signal setting process performed in the instant embodiment of the mixing apparatus 1. The third CUE signal setting process is started up in response to operation of any one of the CUE keys provided in corresponding relation to the channels. At step S40, the channel corresponding to the operated CUE key is set as a channel to be controlled (i.e., control-object channel), and this control-object channel is connected to the CUE bus 36. In this case, the CUE key of the control-object channel is set into the ON state, the CUE key of the channel having so far been connected to the CUE bus 36 is set into the OFF state, and the channel having so far been connected to the CUE bus 36 is disconnected from the CUE bus 36. Further, any one of the channels can be assigned, and an input channel, MIX output channel, stereo output channel or DCA channel is assignable to a channel strip having, among other things, a fader for controlling the level of the assigned channel. The CUE key is provided for each of the channel strips, and the channel assigned to the channel strip having the operated CUE key is set as the control-object channel. Note that, if the channel having so far been connected to the CUE bus 36 is of the same channel type as the control-object channel, then the control-object channel may be additionally connected to the CUE bus 36 without the channel having so far been connected to the CUE bus 36 being disconnected from the CUE bus 36.

Then, at step S41, the channel type of the control-object channel is identified. At next step S42, a branch is made to different operations depending on the identified channel type of the control-object channel. In this case, a CUE signal processing file is recorded in advance for each of the three basic-type channel types (i.e., INPUT, STEREO and MIX channel types), but no CUE signal processing file is recorded for the three applied-type channel types (i.e., KEYIN, first DCA and second DCA types). If the channel type of the control-object channel is identified as the INPUT channel type at step S41, control proceeds from step S42 to step S43, where the CUE signal processing file for the INPUT channel type is read out. Then, at step S48, ON/OFF settings are made in accordance with ON/OFF instructions for all of the signal processing operations (delay 80, insert 82 and EQ 83) included in the CUE signal processing recorded in the read-out CUE signal processing file, and current ON/OFF states of CUE signal processing operations in the CUE signal processing section 39 are changed in such a manner that the CUE signal processing operations are performed in the CUE signal processing section 39 on the basis of the ON/OFF settings made for the INPUT channel.

If the channel type of the control-object channel is identified as the MIX output channel type at step S41, control proceeds from step S42 to step S44, where the CUE signal processing file for the MIX output channel type is read out. Then, at step S48, ON/OFF settings are made in accordance with ON/OFF instructions for all of the signal processing operations (delay 80, insert 82 and EQ 83) included in the CUE signal processing recorded in the read-out CUE signal processing file, and the current ON/OFF states of the CUE signal processing operations in the CUE signal processing section 39 are changed in such a manner that the CUE signal processing operations are performed in the CUE signal processing section 39 on the basis of the ON/OFF settings made for the MIX output channel.

Further, if the channel type of the control-object channel is identified as the STEREO output channel type at step S41, control proceeds from step S42 to step S45, where the CUE signal processing file for the STEREO output channel type is read out. Then, at step S48, ON/OFF settings are made in accordance with ON/OFF instructions for all of the signal processing operations (delay 80, insert 82 and EQ 83) included in the CUE signal processing recorded in the read-out CUE signal processing file, and the current ON/OFF states of the CUE signal processing operations in the CUE signal processing section 39 are changed in such a manner that the CUE signal processing operations are performed in the CUE signal processing section 39 on the basis of the ON/OFF settings made for the STEREO output channel.

Further, if the channel type of the control-object channel is identified as the KEYIN channel type at step S41, control proceeds from step S42 to step S46, where a type of a key-in signal of the control-object channel is identified. Namely, it is identified whether the key-in signal is an INPUT channel key-in signal, MIX output channel key-in signal or STEREO output channel key-in signal. Then, the CUE signal processing file for the identified key-in signal type is read out at step S47. Namely, the CUE signal processing file for the INPUT channel is read out if the identified key-in signal type is "INPUT", the CUE signal processing file for the MIX channel is read out if the identified key-in signal type is "MIX", or the CUE signal processing file for the STEREO output channel is read out if the identified key-in signal type is "STEREO". Then, at step S48, ON/OFF settings are made in accordance with ON/OFF instructions for all of the signal processing operations (delay 80, insert 82 and EQ 83) included in the CUE signal processing recorded in the read-out CUE signal processing file, and the current ON/OFF states of the CUE signal processing operations in the CUE signal processing section 39 are changed in such a manner that the CUE signal processing operations are performed in the CUE signal processing section 39 on the basis of the ON/OFF settings made as above.

Furthermore, if the channel type of the control-object channel is identified as the first or second DCA type at step S41, control proceeds from step S42 to step S49, where a later-described DCA process is performed so that the current ON/OFF states of the CUE signal processing operations in the CUE signal processing section 39 are changed in such a manner that the CUE signal processing operations are performed in the CUE signal processing section 39 on the basis of the ON/OFF settings made for the DCA-type channel.

Upon completion of the operation at step S48 or S49, control proceeds to step S50, where various setting changes are made such that signal processing based on the changed ON/OFF settings is performed in the CUE signal processing section 39. In this setting change operation, settings of the DSPs of the signal processing section 15 are changed because the mixing processing of FIG. 2 and the CUE signal processing section 39 are implemented by the DSPs. Upon completion of the operation at step S50, the third CUE signal setting processing is brought to an end. By performing such third CUE signal setting processing, a combination of signal processing operations to be performed on a cue signal in the CUE signal processing section 39 can be readily set promptly and accurately.

Figure 13:
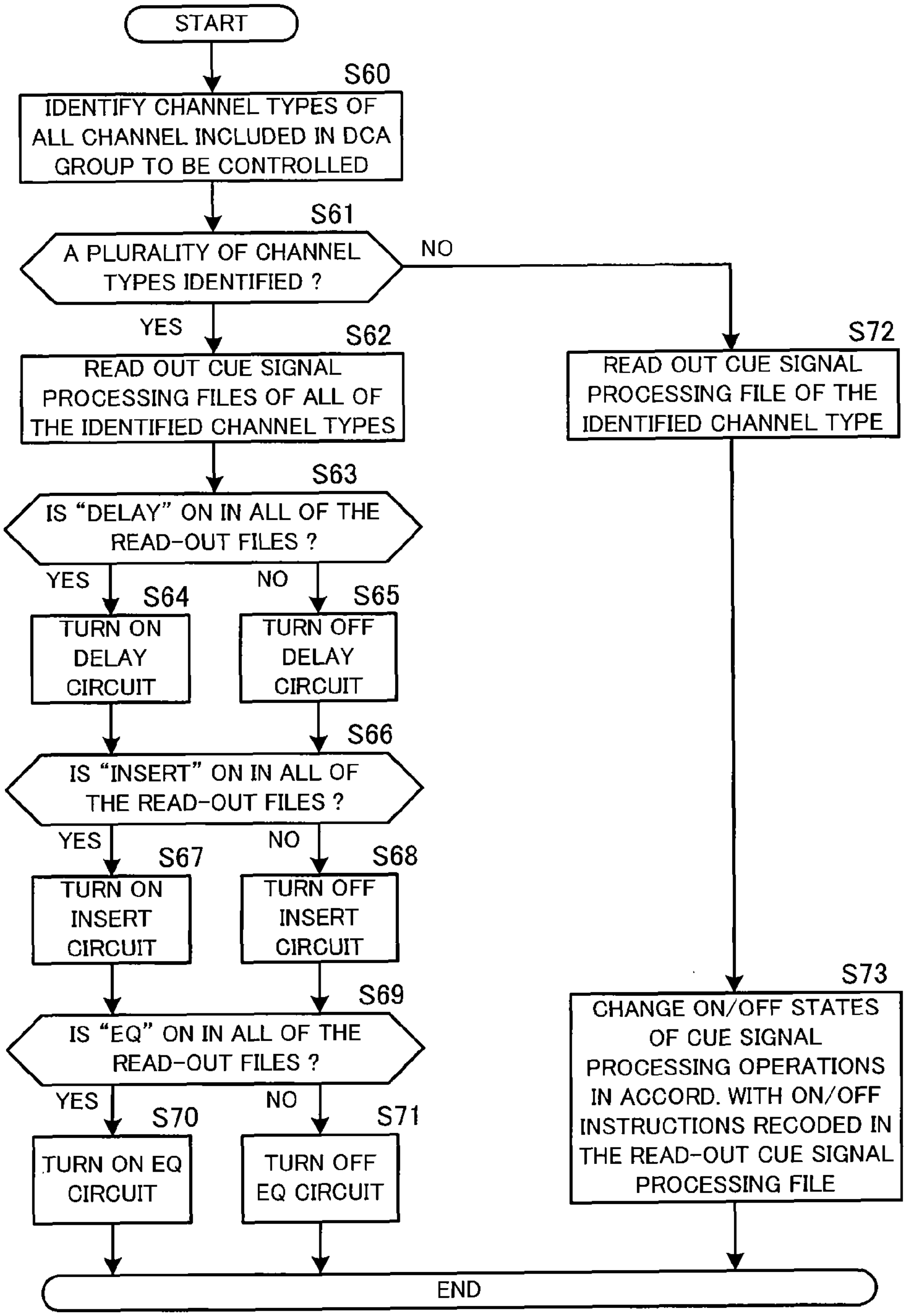
FIG. 13 is a flow chart of a DCA process performed in the mixing apparatus of the present invention.

FIG. 13 is a flow chart of the DCA process performed at step S49 of the third CUE signal setting processing. In this DCA process, the channels of the first and second DCA types are handled as a DCA group (ch). Once the DCA process is started at step S49 of the third CUE signal setting processing, channel types of all of channels included in the DCA group (ch) to be controlled are identified at step S60. Here, it is identified which of the INPUT, MIX output and STEREO output channel types is included in the DCA group (ch). Then, at step S61, a determination is made whether a plurality of channel types have been identified at step S60. If a plurality of channel types have been identified at step S60 as determined at step S61, then control proceeds to step S62, where the CUE signal processing files of all of the identified channel types are read out.

Then, at step S63, a determination is made as to whether "Delay" is set in the ON state in all of the read-out CUE signal processing files of the identified channel types. If "Delay" is set in the ON state in all of the read-out CUE signal processing files of the identified channel types as determined at step S63, then control proceeds to step S64, where the movable contact c of the switch 81 in the CUE signal processing section 39*a* is switched to the fixed contact a so that the delay portion 80 is turned on. If, on the other hand, "Delay" is not set in the ON state in all of the read-out CUE signal processing files of the identified channel types as determined at step S63, control proceeds to step S65, where the movable contact c of the switch 81 in the CUE signal processing section 39*a* is switched to the fixed contact b so that the delay portion 80 is turned off.

Upon completion of the operation at step S64 or S65, control proceeds to step S66, where a determination is made as to whether "Insert" is set in the ON state in all of the read-out CUE signal processing files of the identified channel types. If "Insert" is set in the ON state in all of the read-out CUE signal processing files of the identified channel types as determined at step S66, control proceeds to step S67, where the movable contact c of the switch 82*a* in the CUE signal processing section 39*a* is switched to the fixed contact b so that the insert portion 82 is turned on. If, on the other hand, "Insert" is not set in the ON state in all of the read-out CUE signal processing files of the identified channel types as determined at step S66, control proceeds to step S68, where the movable contact c of the switch 82*a* in the CUE signal processing section 39*a* is switched to the fixed contact a so that the insert portion 82 is turned off.

Upon completion of the operation at step S67 or S68, control proceeds to step S69, where a determination is made as to whether "Equalizer (EQ)" is set in the ON state in all of the read-out CUE signal processing files of the identified channel types read out at step S62. If "Equalizer (EQ)" is set in the ON state in all of the read-out CUE signal processing files of the identified channel types as determined at step S69, control proceeds to step S70, where the movable contact c of the switch 84 in the CUE signal processing section 39*a* is switched to the fixed contact a so that the Equalizer (EQ) portion 83 is turned on. If, on the other hand, "Equalizer (EQ)" is not set in the ON state in all of the read-out CUE signal processing files of the identified channel types as determined at step S69, control proceeds to step S71, where the movable contact c of the switch 84 in the CUE signal processing section 39*a* is switched to the fixed contact b so that the Equalizer (EQ) 83 is turned off.

If only one channel type, not a plurality of channel types, has been identified at step S61, control branches to step S72, where the CUE signal processing file of the identified channel type of the DCA group is read out. Then, at step S73, ON/OFF settings are made in accordance with ON/OFF instructions for all of the signal processing operations (delay 80, insert 82 and EQ 83) included in the CUE signal processing recorded in the read-out CUE signal processing file, and the current ON/OFF states of the CUE signal processing operations in the CUE signal processing section 39 are changed in such a manner that the CUE signal processing operations are performed in the CUE signal processing section 39 on the basis of the ON/OFF settings made as above.

Upon completion of any one of steps S70, S71 and S73, the DCA process is brought to an end, and control reverts step S50 of the third CUE setting processing, so that the aforementioned operation of step S50 is performed.

In the foregoing description, the various channels, such as the input, stereo output, MIX output, key-in, first DCA type and second DCA type channels, are generically referred to as "channels", and INPUT, STEREO OUTPUT, MIX OUTPUT, KEYIN, DCA type 1 and DCA type 2 are indicative of the respective attributes of the aforementioned channels. Thus, in this specification, the term "channels" is used, without the individual channel types being clearly stated, when a description is to be made collectively about the channels of all of the types. The attributes (types) of the channels correspond to types of sound signals. Further, the "basic type" generically refers to types of channels where ON/OFF settings of the various processing operations (delay 80, insert 82 and EQ 83) in the CUE signal processing section 39*a* are set independently without depending on other channel types; three such channel types belonging to the basic type (basic-type channel types), i.e. INPUT, MIX and STEREO, are employed in the instant embodiment. Further, the "applied type" generically refers to types of channels where ON/OFF settings of the various processing operations (delay 80, insert 82 and EQ 83) in the CUE signal processing section 39*a* are set in dependence on other channel types; three such channel types belonging to the basic type (applied-type channel types), i.e. first DCA type, second DCA type and KEYIN.

The channel types employable in the present invention are not limited to those employed in the above-described embodiment, and they may include a MATRIX channel that processes a signal of a MATRIX bus and outputs the thus-processed signal, GEQ channel that performs an EQ operation on a signal input from any one of the other channels and outputs the thus-processed signal, plug-in channel that imparts an plugged-in effect to a sound signal input from any one of the other channels and outputs the effect-imparted signal, etc. In this case, the MATRIX channel is handled in a similar manner to the basic-type channel types (i.e., input, stereo output and MIX output channels), and the GEQ channel and plug-in channel are handled in a similar manner to the applied-type channel types (i.e., key-in and DCA channels).

Further, in the foregoing description, one DCA group has been described as including a plurality of channels and corresponding to one DCA channel. In the mixing apparatus 1, a plurality of DCA groups may be formed, in which case one DCA group may comprise a plurality of channels of a same channel type or different channel types, like the first DCA channel type and second DCA channel type.

Further, one key-in signal corresponds to one key-in channel. In this case, there are a plurality of, i.e. three, types of key-in signals: key-in signal input to an input channel (input channel key-in signal); key-in signal input to a stereo output channel (stereo output channel key-in signal); and key-in signal input to a MIX output channel (MIX output channel key-in signal).

When the CUE signal processing file has been edited in any one of the CUE editing UIs 90 and 91 shown in FIGS. 7 and 10, any one of the first to third CUE signal setting processing shown in FIGS. 8, 9 and 12 may be started up, with a channel currently cued at the editing time point being set as a control-object channel, so that new ON/OFF settings made by the editing can be promptly reflected in the mixing apparatus 1. The created or edited CUE signal processing file is recorded into the RAM 12.

Further, whereas the embodiment of the mixing apparatus 1 has been described above in relation to the case where three signal processing operations, "Delay", "Insert" and "EQ", are performed on a cue signal input to the CUE signal processing section 39, the present invention is not so limited, and one or more other signal processing operations, such as compressor and filter operations, may also be performed in combination with the "Delay", "Insert" and "EQ" operations. Further, the number and combination of the signal processing operations are not limited to those described in relation to the embodiment of the mixing apparatus 1; any two of the aforementioned three signal processing operations, "Delay", "Insert" and "EQ" operations, or four or more signal processing operations including the aforementioned three signal processing operations, "Delay", "Insert" and "EQ" operations, may be performed in the present invention. The order of the signal processing operations too is not limited to the one described in relation to the embodiment of the mixing apparatus 1.

Furthermore, whereas the embodiment of the mixing apparatus 1 has been described above in relation to the case where a total of six types of channels can be cued, the present invention is not so limited, and the present invention may include, as the channel types that can be cued, MATRIX (sub-mix output channel) where signals of a plurality of output channels are handled as inputs and mixed via a matrix bus so that the mixed result is output from the channel, PLUG-IN mainly patched to an output terminal of an inserting plug-in, SUB-IN that supplies an output of the input patch section 32 directly to the CUE bus 36, etc.

Whereas the embodiment of the mixing apparatus 1 has been described above as automatically setting current values of ON/OFF settings of the various processing operations (Delay, Insert and EQ) of the CUE signal processing section 39 recorded in the current buffer, the user may change the values of ON/OFF settings as desired. The present application is based on, and claims priorities to, JP PA. 2009-180376 filed on Aug. 3, 2009 and JP PA. 2010-082137 filed on Mar. 31, 2010. The disclosure of the priority applications, in its entirety, including the drawings, claims, and the specification thereof, is incorporated herein by reference.

What is claimed is:

1. An audio mixing apparatus comprising:
- a plurality of input channels;
- a plurality of audio mixing buses which mix signals supplied from said input channels;
- a plurality of output channels which output the signals mixed by said audio mixing buses;
- a cue bus;
- a storage; and
- one or more processors configured to:
  - select at least one of the input and output channels, wherein the signal of the selected channel is supplied to the cue bus;
  - perform one or more signal processing operations, selected from among a predetermined plurality of different signal processing operations, on the signal supplied to said cue bus;
  - store in the storage, for each of a plurality of channel types, a set of setting information which contains information for setting ON or OFF of individual ones of the plurality of different signal processing operations, each of the input and output channels being classified into at least one of the plurality of channel types in accordance with an attribute of the channel;
  - reference the set of setting information corresponding to the channel type of the selected channel;
  - determine the one or more signal processing operations in such a manner that each signal processing operation set in an ON state in the set of setting information in correspondence with the channel type of the selected channel is performed on the signal supplied to the cue bus;
  - reference a determining rule corresponding to a channel type, belonging to an applied type, of the selected channel;
  - reference the set of setting information corresponding to a given channel type belonging to a basic type to be depended on in accordance with the determining rule; and
  - determine, for each of the plurality of different signal processing operations, whether the signal processing operation should be set in the ON or OFF state, in accordance with the referenced set of setting information and the referenced determining rule;
- wherein the plurality of channel types are broadly classified into the basic type and the applied type, content of each set of setting information corresponding to each of the channel types belonging to the basic type being settable independently for each of the channel types belonging to the basic type, and wherein each of the channel types belonging to the applied type is associated with at least one of the channel types belonging to the basic type, content of each set of setting information corresponding to each of the channel types belonging to the applied type being set in dependence on the content of the set of setting information of the channel type which belongs to the basic type and with which the channel type belonging to the applied type is associated.

2. The audio mixing apparatus as claimed in claim 1, wherein the one or more processors are further configured to allow a user to edit and update content of each set of setting information.

3. The audio mixing apparatus as claimed in claim 2, wherein the one or more processors are further configured to display, on a display device, a GUI screen for editing the content of each set of setting information, and allow a user to perform, via the GUI screen, editing operation for, per each of the plurality of channel types, setting each of the plurality of different signal processing operations in an ON or OFF state.

4. The audio mixing apparatus as claimed in claim 1, wherein, where one channel type belonging to the applied type is associated with only one of a plurality of channel types belonging to the basic type, the set of setting information corresponding to the one channel type belonging to the applied type is set to same content as the set of setting information corresponding to the one channel type which belongs to the basic type and with which the one channel type belonging to the applied type is associated, and wherein, where one channel type belonging to the applied type is associated with two or more of the plurality of channel types belonging to the basic type, the set of setting information corresponding to the one channel type belonging to the applied type is set to content obtained by synthesizing, through ANDed logic, respective content of the sets of setting information corresponding to the two or more channel types which belong to the basic type and with which the one channel type belonging to the applied type is associated.

5. The audio mixing apparatus as claimed in claim 1, wherein the plurality of different signal processing operations include delay, insert and equalizer operations.

6. A method for setting ON or OFF of a signal processing operation in an audio mixing apparatus, the audio mixing apparatus comprising:

a plurality of input channels;

a plurality of audio mixing buses which mix signals supplied from said input channels;

a plurality of output channels which output the signals mixed by said audio mixing buses;

a cue bus; and a storage, said method comprising:

selecting at least one of the input and output channels, wherein the signal of the selected channel is supplied to the cue bus;

performing one or more signal processing operations, selected from among a predetermined plurality of different signal processing operations, on the signal supplied to said cue bus;

storing in the storage, for each of a plurality of channel types, a set of setting information which contains information for setting ON or OFF of individual ones of the plurality of different signal processing operations, each of the input and output channels being classified into at least one of the plurality of channel types in accordance with an attribute of the channel;

referencing the set of setting information corresponding to the channel type of the selected channel;

determining the one or more signal processing operations in such a manner that each signal processing operation set in an ON state in the set of setting information in correspondence with the channel type of the selected channel is performed on the signal supplied to the cue bus;

referencing a determining rule corresponding to a channel type, belonging to an applied type, of the selected channel;

referencing the set of setting information corresponding to a given channel type belonging to a basic type to be depended on in accordance with the determining rule; and determining, for each of the plurality of different signal processing operations, whether the signal processing operation should be set in the ON or OFF state, in accordance with the referenced set of setting information and the referenced determining rule;

wherein the plurality of channel types are broadly classified into the basic type and the applied type, content of each set of setting information corresponding to each of the channel types belonging to the basic type being settable independently for each of the channel types belonging to the basic type, and wherein each of the channel types belonging to the applied type is associated with at least one of the channel types belonging to the basic type, content of each set of setting information corresponding to each of the channel types belonging to the applied type being set in dependence on the content of the set of setting information of the channel type which belongs to the basic type and with which the channel type belonging to the applied type is associated.

7. An audio mixing apparatus comprising:

a plurality of input channels;

a plurality of audio mixing buses which mix signals supplied from said input channels;

a plurality of output channels which output the signals mixed by said audio mixing buses;

a cue bus;

a storage; and one or more processors configured to:

select at least one of the input and output channels, wherein the signal of the selected channel is supplied to the cue bus;

perform one or more signal processing operations, selected from among a predetermined plurality of different signal processing operations, on the signal supplied to said cue bus;

store in the storage, for each of a plurality of channel types belonging to a basic type, a set of setting information which contains information for setting ON or OFF of individual ones of the plurality of different signal processing operations, each of the input and output channels being classified into at least one of the plurality of channel types in accordance with an attribute of the channel, the plurality of channel types being broadly classified into the basic type and an applied type, and further store in the storage, for each of channel types belonging to the applied type, a determining rule for setting each of the plurality of different signal processing operations in an ON or OFF state Independence on the set of setting information;

reference the set of setting information corresponding to a channel type, belonging to the basic type, of the selected channel;

determine the one or more signal processing operations, in such a manner that each signal processing operation set in the ON state in the set of setting information in correspondence with the channel type of the selected channel is performed on the signal supplied to the cue bus;

reference the determining rule corresponding to a channel type, belonging to the applied type, of the selected channel;

reference the set of setting information corresponding to a given channel type belonging to the basic type to be depended on in accordance with the determining rule;

determine, for each of the plurality of different signal processing operations, whether the signal processing operation should be set in the ON or OFF state, in accordance with the referenced set of setting information and the referenced determining rule; and determine the one or more signal processing operations, in such a manner that each signal processing operation set in the ON state is performed on the signal supplied to the cue bus.

8. The audio mixing apparatus as claimed in claim 7, wherein the one or more processors are further configured to allow a user to edit and update content of each set of setting information.

9. The audio mixing apparatus as claimed in claim 8, wherein the one or more processors are further configured to display, on a display device, a GUI screen for editing content of each set of setting information, and allow a user to perform, via the GUI screen, editing operation for, per each of a plurality of channel types belonging to the basic type, setting each of the plurality of different signal processing operations in the ON or OFF state.

10. The audio mixing apparatus as claimed in claim 7, wherein the determining rule for each channel belonging to the applied type comprises:

associating the channel belonging to the applied type with at least one of a plurality of channel types belonging to the basic type;

where the channel type belonging to the applied type is associated with only one of the plurality of channel types belonging to the basic type, determining, for each of the plurality of different signal processing operations, whether the signal processing operation should be set in the ON or OFF state, in accordance with the content of the set of setting information corresponding to the one channel type belonging to the basic type; and where the channel type belonging to the applied type is associated with two or more of a plurality of channel types belonging to the basic type, determining, for each of the plurality of different signal processing operations, whether the signal processing operation should be set in the ON or OFF state, in accordance with content obtained by synthesizing, through ANDed logic, respective content of the sets of setting information corresponding to the two or more channel types which belong to the basic type and with which the one channel type belonging to the applied type is associated.

11. A method for setting ON or OFF of a signal processing operation in an audio mixing apparatus, the audio mixing apparatus comprising:

a plurality of input channels;

a plurality of audio mixing buses which mix signals supplied from said input channels;

a plurality of output channels which output the signals mixed by said audio mixing buses;

a cue bus; and a storage, said method comprising:

selecting at least one of the input and output channels, wherein the signal of the selected channel is supplied to the cue bus;

performing one or more signal processing operations, selected from among a predetermined plurality of different signal processing operations, on the signal supplied to said cue bus;

storing in the storage, for each of a plurality of channel types belonging to a basic type, a set of setting information which contains information for setting ON or OFF of individual ones of the plurality of different signal processing operations, each of the input and output channels being classified into at least one of the plurality of channel types in accordance with an attribute of the channel, the plurality of channel types being broadly classified into the basic type and an applied type, and further storing in the storage, for each of channel types belonging to the applied type, a determining rule for determining an ON or OFF state of each of the plurality of different signal processing operations in dependence on the set of setting information;

referencing the set of setting information corresponding to a channel type, belonging to the basic type, of the selected channel;

determining the one or more signal processing operations, in such a manner that each signal processing operation set in the ON state in the set of setting information in correspondence with the channel type of the selected channel is performed on the signal supplied to the cue bus;

referencing the determining rule corresponding to a channel type, belonging to the applied type, of the selected channel;

referencing the set of setting information corresponding to a given channel type belonging to the basic type to be depended on in accordance with the determining rule;

determining, for each of the plurality of different signal processing operations, whether the signal processing operation should be set in the ON or OFF state, in accordance with the referenced set of setting information and the referenced determining rule; and determining the one or more signal processing operations in such a manner that each signal processing operation set in the ON state is performed on the signal supplied to the cue bus.

12. An audio mixing apparatus comprising:

a plurality of input channels;

a plurality of audio mixing buses which mix signals supplied from said input channels;

a plurality of output channels which output the signals mixed by said audio mixing buses;

a cue bus;

a storage; and one or more processors configured to:

select at least one of the input and output channels, wherein the signal of the selected channel is supplied to the cue bus;

perform one or more signal processing operations, selected from among a predetermined plurality of different signal processing operations, on the signal supplied to said cue bus;

store in the storage, for each of one or some of a plurality of channel types, a set of setting information which contains information for setting ON or OFF of individual ones of the plurality of different signal processing operations, each of the input and output channels being classified into at least one of the plurality of channel types in accordance with an attribute of the channel;

determine whether a channel type of the selected channel is among said one or some of a plurality of channel types;

if it has been determined that the channel type of the selected channel is among said one or some of a plurality of channel types, reference the set of setting information corresponding to the channel type of the selected channel, and determine the one or more signal processing operations, in such a manner that each signal processing operation set in an ON state in the setting file in correspondence with the channel type of the selected channel is performed on the signal supplied to the cue bus;

if it has been determined that the channel type of the selected channel is not among said one or some of a plurality of channel types, determine whether the channel type of the selected channel is associated with any one of said one or some of a plurality of channel types; and if it has been determined that the channel type of the selected channel is associated with any one of said one or some of a plurality of channel types, reference the set of setting information corresponding to the one channel type with which the channel type of the selected channel is associated, and determine the one or more signal processing operations, in such a manner that each signal processing operation set in the ON state in correspondence with the channel type corresponding to the referenced set of setting information is performed on the signal supplied to the cue bus.

13. The audio mixing apparatus as claimed in claim 12, wherein the one or more processors are further configured to allow a user to edit and update content of each set of setting information.

14. The audio mixing apparatus as claimed in claim 13, wherein the one or more processors are further configured to display, on a display device, a GUI screen for editing the content of each set of setting information and allow a user to perform, via the GUI screen, editing operation for, per each of said one or some of a plurality of channel types, setting each of the plurality of different signal processing operations in an ON or OFF state.

15. A method for setting ON or OFF of a signal processing operation in an audio mixing apparatus, the audio mixing apparatus comprising:

a plurality of input channels;

a plurality of audio mixing buses which mix signals supplied from said input channels;

a plurality of output channels which output the signals mixed by said audio mixing buses;

a cue bus;

a storage, said method comprising:

selecting at least one of the input and output channels, wherein the signal of the selected channel is supplied to the cue bus;

performing one or more signal processing operations, selected from among a predetermined plurality of different signal processing operations, on the signal supplied to said cue bus;

storing in the storage, for each of one or some of a plurality of channel types, a set of setting information which contains information for setting ON or OFF of individual ones of the plurality of different signal processing operations, each of the input and output channels being classified into at least one of the plurality of channel types in accordance with an attribute of the channel;

determining whether a channel type of the selected channel is among said one or some of a plurality of channel types;

if it has been determined that the channel type of the selected channel is among said one or some of a plurality of channel types, referencing the set of setting information corresponding to the channel type of the selected channel and determining the one or more signal processing operations, in such a manner that each signal processing operation set in an ON state in the set of setting information in correspondence with the channel type of the selected channel is performed on the signal supplied to the cue bus;

if it has been determined that the channel type of the selected channel is not among said one or some of a plurality of channel types, further determining whether the channel type of the selected channel is associated with any one of said one or some of a plurality of channel types; and if it has been determined that the channel type of the selected channel is associated with any one of said one or some of a plurality of channel types, referencing the set of setting information corresponding to the one channel type with which the channel type of the selected channel is associated and determining the one or more signal processing operations, in such a manner that each signal processing operation set in the ON state in correspondence with the channel type corresponding to the referenced set of setting information is performed on the signal supplied to the cue bus.

* * * * *